United States Patent
Hamaguchi et al.

(10) Patent No.: US 8,730,896 B2
(45) Date of Patent: May 20, 2014

(54) TRANSMIT POWER CONTROL METHOD AND TRANSMISSION APPARATUS

(75) Inventors: Yasuhiro Hamaguchi, Osaka (JP); Kazunari Yokomakura, Osaka (JP); Osamu Nakamura, Osaka (JP); Jungo Goto, Osaka (JP); Hiroki Takahashi, Osaka (JP); Daiichiro Nakashima, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 132 days.

(21) Appl. No.: 13/376,556

(22) PCT Filed: Apr. 23, 2010

(86) PCT No.: PCT/JP2010/057292
§ 371 (c)(1),
(2), (4) Date: Jan. 27, 2012

(87) PCT Pub. No.: WO2010/143478
PCT Pub. Date: Dec. 16, 2010

(65) Prior Publication Data
US 2012/0281644 A1    Nov. 8, 2012

(30) Foreign Application Priority Data
Jun. 8, 2009 (JP) ................ 2009-137568

(51) Int. Cl.
*H04W 4/00* (2009.01)
*H04W 52/22* (2009.01)
*H04W 72/04* (2009.01)

(52) U.S. Cl.
CPC .............. *H04W 52/22* (2013.01); *H04W 72/04* (2013.01)
USPC ........................................ 370/329

(58) Field of Classification Search
CPC ..................................... H04W 52/22
USPC ............................................ 370/329
See application file for complete search history.

(56) References Cited

U.S. PATENT DOCUMENTS

| 6,553,018 | B1 | 4/2003 | Ichihara |
| 7,797,014 | B2 * | 9/2010 | Lee et al. ............ 455/522 |
| 2010/0098177 | A1 | 4/2010 | Hamaguchi et al. |

FOREIGN PATENT DOCUMENTS

JP    8-46660 A    2/1996

(Continued)

OTHER PUBLICATIONS

Nokia Siemens Network, 3GPP TSG WG1 #56 Meeting, Athens, Greece, Feb. 9-13, 2009, R1-090738,"PUSCH Power Control for LTE-Advance", Entire document.*

(Continued)

*Primary Examiner* — Mark Rinehart
*Assistant Examiner* — Maharishi Khirodhar
(74) *Attorney, Agent, or Firm* — Birch, Stewart, Kolasch & Birch, LLP

(57) ABSTRACT

In the system of a variable transmission bandwidth, transmit power control for minimizing an impact on a circuit is performed. There is provided a transmit power control method that is applied to a transmission apparatus that transmits data through the use of a different transmission format at each transmission opportunity, in which transmit power is controlled depending on the transmission format before digital/analogue conversion is performed on transmission data, and, based on the transmit power control, the transmit power is controlled on the transmission data that has been subjected for the digital/analogue conversion. In addition, the transmission format specifies a frequency bandwidth used for transmission of the transmission data.

13 Claims, 6 Drawing Sheets

(56) References Cited

FOREIGN PATENT DOCUMENTS

| JP | 11-266168 A | 9/1999 |
|---|---|---|
| JP | 2001-168741 A | 6/2001 |
| JP | 2002-271292 A | 9/2002 |
| JP | 2004-336564 A | 11/2004 |
| WO | WO 2008/081876 A1 | 7/2008 |

OTHER PUBLICATIONS

3rd Generation Partnership Project; Technical Specification Group Radio Access Network; Evolved Universal Terrestrial Radio Access (E-UTRA); Physical layer procedures (Release 8), 3GPP TS 36.213 V8.6.0 (Mar. 2009), 3GPP, Mar. 2009, pp. 9 to 15.
Huawei, Carrier aggregation in LTE-Advanced, 3GPP TSG RAN WG1 Meeting #55 R1-084346, Nov. 10, 2008, entire text.

* cited by examiner

TRANSMIT POWER CONTROL METHOD AND TRANSMISSION APPARATUS

TECHNICAL FIELD

The present invention relates to a transmit power control method that is applied to a transmission apparatus which transmits data through the use of a different transmission format at each transmission opportunity, and to a transmission apparatus.

BACKGROUND ART

In a conventionally known wireless communication technology, an uplink (also referred to as an "up") generally means a channel through which data is transmitted from a mobile station apparatus to a base station apparatus when the base station apparatus and the mobile station apparatus communicate with each other in cellular communication or the like. In this uplink, the base station apparatus simultaneously receives signals from various mobile station apparatuses. Therefore, if the levels of reception power from various mobile station apparatuses are equal to each other, the base station apparatus can easily perform reception processing, and excellent reception properties are also achieved. In order to realize this, a method of controlling the transmit power of a signal transmitted by the mobile station apparatus is introduced into a cellular system, and this is referred to as transmit power control (TPC).

A formula used for determining a transmit power value used in the data communication of an uplink that is defined in specifications (non-patent document 1) on next-generation cellular communication (3.9G) is shown below.

[Formula 1]

$$P_{PUSCH}(i)=\min\{P_{CMAX}, 10\log_{10}(M_{PUSCH}(i))+P_{O\_PUSCH}(j)+\alpha(j)\cdot PL+\Delta_{TF}(i)+f(i)\} \quad (1)$$

In formula (1), PUSCH stands for physical uplink shared channel, and represents a data channel through which data for an uplink is transmitted. $P_{PUSCH}$ (i) represents a transmit power value in the i-th frame. min {X, Y} is a function for selecting the minimum value from X and Y. $Po_{\_PUSCH}$ is transmit power on which PUSCH is based, and is a value that is specified by an upper layer. $M_{PUSCH}$ represents the number of resource blocks (RB: a unit used when a terminal accesses a base station) used for transmission in a data channel, and indicates that, as the number of RBs used is increased, the transmit power is increased. In addition, PL represents path loss, and α is a coefficient by which the path loss is multiplied and is specified by the upper layer. $\Delta_{TF}$ is an offset value in a modulation scheme or the like, and f is an offset value (a transmit power control value in a closed loop) calculated by a control signal from the base station. Furthermore, $P_{CMAX}$ is the maximum transmit power value, and $P_{CMAX}$ may be physically the maximum transmit power or may be specified by the upper layer.

Next, a formula used for determining a transmit power value used in control data communication is shown below.

[Formula 2]

$$P_{PUSCH}(i)=\min\{P_{CMAX}, P_{0\_PUSCH}+PL+h(n_{CQI}, n_{HARQ})+\Delta_{F\_PUCCH}(F)+g(i)\} \quad (2)$$

In formula (2), PUCCH stands for physical uplink control channel, and represents a control channel through which control data in an uplink is transmitted. Although parameters used in formula (2) is approximately the same as used in formula (1), since the number of RBs has been determined in the control data, there is no parameter that depends on the number of RBs. A coefficient by which path loss is multiplied is not set. Here, h is a parameter that is determined by what information is included in data on PUCCH, and an offset value is determined by the type of data. g is an offset value (a transmit power control value in a closed loop) calculated by a control signal from the base station.

Meanwhile, in the next-generation cellular system, as an uplink communication method, DFT-S-OFDMA (stands for discrete Fourier transform spread orthogonal frequency division multiple access, and is also referred to as SC-FDMA: single carrier frequency division multiple access or DFT pre-coded OFDM) is used. This method has the property of a signal in a single carrier method and a very excellent PAPR (peak to average power ratio) property.

The PUSCH and the PUCCH described above have different frequency bands that are allocated, and although the mobile station apparatus can physically perform simultaneous transmission in the PUSCH and the PUCCH, the simultaneous transmission is not performed in the PUSCH and the PUCCH in the specifications of the next-generation cellular communication (3.9G), in consideration of degradation of the PAPR property caused by performing the simultaneous transmission.

Furthermore, in a more advanced generation (4G), a technology referred to as carrier aggregation is being examined in which systems whose specifications have been specified in 3.9G are caused to function as one system by being used in parallel in a plurality of different frequency bands. This technology has the advantage of more simply enhancing a throughput.

Moreover, the extension of the communication method is being examined, and one of the candidates is a method referred to as a clustered DFT-S-OFDM. In this method, RBs are discretely used although RBs continuous in a frequency region are used in the DFT-S-OFDM method. Since the clustered DFT-S-OFDM is characterized in that discrete RBs are used, the PAPR property is degraded, but the diversity effects of frequency selection can be expected. Furthermore the number of RBs that cannot be used due to restriction of the use of continuous RBs can be reduced.

Non-patent document 1: 3gpp ts 36. 213

FIG. 6 is a diagram showing the configuration of a transmission apparatus based on the specifications of 3.9G. In FIG. 6, a scrambling section 200 scrambles data on the PUSCH. A modulation section 201 performs error correction and digital modulation. A DFT pre-coding section 202 performs pre-coding through DFT. A modulation section 203 modulates data in the PUCCH. A spreading section 204 performs data spreading specified by the specifications. A selection section 205 performs selection based on which one of the PUSCH and the PUCCH is transmitted.

A resource map section 206 allocates data to be transmitted to a subcarriers to be transmitted. An OFDM signal generation section 207 generates an OFDM signal including a guard interval. A RF section 208 is constituted by to a subcarriers to be ranging from a D/A conversion (digital/analog conversion) section to an antenna. The RF section 208 includes a transmit power control section A, and a control section 209 performs transmit power control.

The following formula is a formula for determining transmit power in 3.9G.

[Formula 3]

$$P_{PUSCH}(i)=\min\{P_{CMAX}, 10\log_{10}(M_{PUSCH}(i))+P_{O\_PUSCH}(j)+\alpha(j)\cdot PL+\Delta_{TF}(i)+f(i)\} \quad (3)$$

$$P_{PUCCH}(i)=\min\{P_{CMAX}, P_{0\_PUCCH}+PL+h(n_{CQI},n_{HARQ})+\Delta_{F\_PUCCH}(F)+g(i)\} \quad (4)$$

In the circuit configuration shown in FIG. 6, transmit power control is performed such that the transmission apparatus uses the transmit power control section A to control transmit power and that consequently, the transmit power can be expressed by formula (3) or formula (4).

In W-CDMM used in 3G, as the output power of the transmission apparatus, an output power of about −50 dBm to 24 dBm is required. When this value is applied to a 3.9G system without being processed, a variable region of about 74 dB is determined in the transmit power control section A. Furthermore, in 3.9G, the frequency bandwidth of transmission is variable.

For example, if the 3.9G system is a system that can be used from 1 RB to 100 RB, an input power to an amplifier is varied by 20 dB. If an output power of −50 dBm to 24 dBm is required for all the RBs, the transmit power control section A totally needs a variable region of 94 dB. Further, this becomes a serious problem when a larger number of RBs are used by the transmission apparatus as in the carrier aggregation.

Another problem is that, since the number of RBs used is different, it is likely that a bit resolution required for the D/A conversion section is affected. For example, a difference of 20 dB in the input power corresponds to a resolution of 6 bits to 7 bits. Furthermore, when, in the configuration shown in FIG. 6, the PUCCH and the PUSCH are transmitted at the same time, it is impossible to perform transmit power control in each physical channel, and it is also impossible to perform transmit power control in units of the carrier aggregation.

The present invention has been made in view of the foregoing conditions, and an object of the present invention is to provide a transmit power control method and a transmission apparatus which can perform transmit power control to minimize an impact on a circuit in a system of a variable transmission bandwidth.

DISCLOSURE OF THE INVENTION (1) To achieve the above object, the present invention provides the following means. According to the present invention, there is provided a transmit power control method that is applied to a transmission apparatus that transmits data through the use of a different transmission format at each transmission opportunity, the transmit power control method including: a transmit power control step of controlling transmit power depending on the transmission format before digital/analogue conversion is performed on transmission data; and a transmit power control step of controlling, based on the transmit power control, the transmit power on the transmission data that has been subjected to the digital/analogue conversion.

Since, as described above, before the digital/analogue conversion is performed on the transmission data, the transmit power is controlled depending on the transmission format, it is possible not only to perform the transmit power control without greatly affecting the analogue circuit but also to reduce accuracy required for the digital/analogue conversion section.

(2) In the transmit power control method of the present invention, the transmission format specifies a frequency bandwidth used for transmission of the transmission data.

With this configuration, it is possible to apply the present invention to a system of a variable bandwidth.

(3) In the transmit power control method of the present invention, the transmit power is discretely controlled in accordance with the frequency bandwidth.

Since, as described above, the transmit power is discretely controlled in accordance with the frequency bandwidth, it is possible to simplify the processing.

(4) In the transmit power control method of the present invention, the transmission format specifies the number of component carriers used for transmission of the transmission data.

With this configuration, it is possible to reduce the accuracy required for the digital/analogue conversion section. It is also possible to design the control gain range of the transmit power control section of the RF section such that the control gain range is prevent from being increased by a change in the number of RBs used.

(5) In the transmit power control method of the present invention, the transmission format specifies different physical channels that are simultaneously transmitted.

With this configuration, it is possible not only to simultaneously transmit different physical channels but also to reduce the accuracy required for the digital/analogue conversion section.

(6) In the transmit power control method of the present invention, the transmission format specifies whether or not different physical channels are simultaneously transmitted.

With this configuration, it is possible to prevent an increase in the circuit size and an increase in power consumption without affecting the resolution of the IFFT (inverse fast Fourier transform) circuit used in the generation of the OFDM (orthogonal frequency division multiple access) signal.

(7) In the transmit power control method of the present invention, the frequency bandwidth used for transmission of the transmission data is formed with a plurality of component carriers, and the transmit power is controlled for each of the component carriers.

With this configuration, it is possible to adjust the quality in each of the component carriers in depending on the quality of service QoS of communication, interference from other cells, transmission capacity and the like.

(8) According to the present invention, there is provided a transmission apparatus that transmits data through the use of a different transmission format at each transmission opportunity, the transmission apparatus including: an OFDM signal generation section that generates an OFDM signal; a first transmit power control section that controls a transmit power before the generation of the OFDM signal; a second transmit power control section that controls a transmit power after the generation of the OFDM signal; a digital/analogue conversion section that performs digital/analogue conversion on transmission data; a third transmit power control section that controls a transmit power for the transmission data which has been subjected to the digital/analogue conversion; and a control section that controls the transmit power control sections such that the first to third transmit power control sections perform predetermined transmit power control.

With this configuration, since the transmit power is controlled depending on the transmission format before the digital/analogue conversion is performed on the transmission data, it is possible not only to perform the transmit power control without greatly affecting the analogue circuit but also to reduce the accuracy required for the digital/analogue conversion section.

(9) In the transmission apparatus of the present invention, the first transmit power control section controls the transmit power in each physical channel.

With this configuration, it is possible not only to simultaneously transmit different physical channels but also to reduce the accuracy required for the digital/analogue conversion section.

(10) In the transmission apparatus of the present invention, the second transmit power control section performs control such that power input to the digital/analogue conversion section is approximately constant.

With this configuration, it is possible to reduce the accuracy required for the digital/analogue conversion section.

(11) In the transmission apparatus of the present invention, the second transmit power control section controls the transmit power for each component carrier.

With this configuration, it is possible to adjust the quality in each of the component carriers in accordance with the quality of service QoS of communication, interference from other cells, transmission capacity and the like.

According to the present invention, in a transmission apparatus used in the system of a variable bandwidth, it is possible to perform transmit power control without greatly affecting an analogue circuit. Furthermore, it is also possible to perform transmit power control in each physical channel or for each component carrier and to perform control such that the dynamic range of the amount of information indicating amplitude in a digital processing circuit is decreased.

BEST MODES FOR CARRYING OUT THE INVENTION

Figure 1:
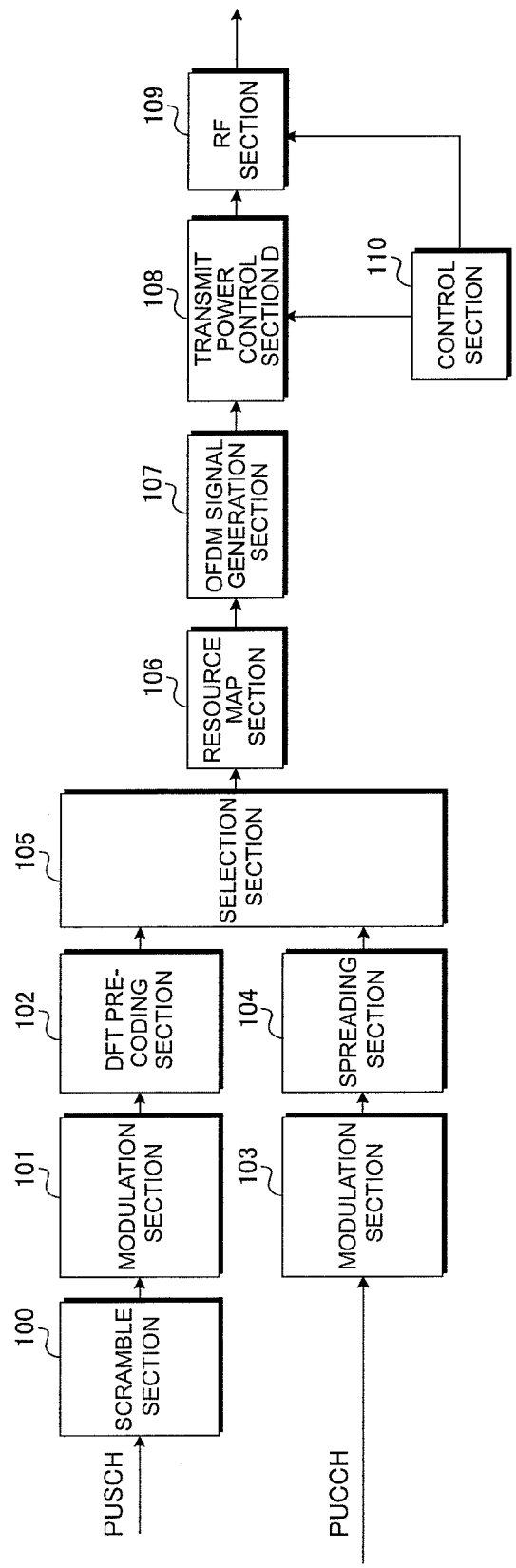
FIG. 1 A block diagram showing a schematic configuration of a transmission apparatus according to a first embodiment.

Embodiments of the present invention will be described below with reference to accompanying drawings. Although, in the present embodiment, a description will be given through the use of an uplink through which data is transmitted from a mobile station apparatus to a base station apparatus, the present invention is not limited to this configuration. In addition, in the present invention, a description will be given on the assumption that a transmission apparatus can transmit data by changing a transmission format at each transmission opportunity (frame unit or packet unit).

As an example, a formula used for determining a transmit power value that is used in uplink data communication defined in the specifications (non-patent document 1) of the next-generation cellular communication (3.9G) is shown.

[Formula 4]

$$P_{PUSCH}(i)=\min\{P_{CMAX},10\log_{10}(M_{PUSCH}(i))+P_{O\_PUSCH}(j)+\alpha(j)\cdot PL+\Delta_{TF}(i)+f(i)\} \quad (5)$$

In formula (5), PUSCH stands for physical uplink shared channel, and represents a data channel through which data for an uplink is transmitted. $P_{PUSCH}(i)$ represents a transmit power value in the i-th frame. min $\{X, Y\}$ is a function for selecting the minimum value from X and Y. $P_{O\_PUSCH}$ is transmit power on which PUSCH is based, and is a value that is provided by higher layer. $M_{PUSCH}$ represents the number of resource blocks (RB: a unit used when a terminal accesses a base station) used for transmission in a data channel, and means that, as the number of RBs used is increased, the transmit power is increased.

Furthermore, PL represents path loss, and α is a coefficient by which the path loss is multiplied and is provided by higher layer. $\Delta_{TF}$ is an offset value in a modulation scheme or the like, and f is an offset value (a transmit power control value in a closed loop) calculated by a control signal from the base station. In addition, $P_{CMAX}$ is the maximum transmit power value, and $P_{CMAX}$ may be physically the maximum transmit power or may be specified by the upper layer.

Next, a formula used for determining a transmit power value used in control data communication is shown below.

[Formula 5]

$$P_{PUCCH}(i)=\min\{P_{CMAX},P_{O\_PUCCH}+PL+h(n_{CQI},n_{HARQ})+\Delta_{F\_PUCCH}(F)+g(i)\} \quad (6)$$

In formula (6), PUCCH stands for physical uplink control channel, and represents a control channel through which control data for an uplink is transmitted. Although parameters used in formula (6) is approximately the same as used in formula (5), since the number of RBs is determined in the control data, there is no parameter that depends on the number of RBs. Furthermore, a coefficient by which path loss is multiplied is not set. Here, h is a parameter that is determined by what information is included in data on PUCCH, and an offset value is determined by the type of data. Here, g is its offset value (a transmit power control value in a closed loop) calculated by a control signal from the base station.

Although, in the embodiments described below, for ease of description, a description will be implicitly given on the assumption that a power control gain of each power control section is a positive value, this does not prevent the effects of the invention from being produced when the gain of an attenuator or the like is negative. In addition, the gain means a power difference between the input and output of the power control section.

First Embodiment

In a first embodiment, a transmission apparatus that can transmit data in a different frequency bandwidth used at each transmission opportunity (frame unit or packet unit) will be described. FIG. 1 is a block diagram showing a schematic configuration of the transmission apparatus according to the first embodiment. In FIG. 1, a scramble section 100 scrambles data in the PUSCH. A modulation section 101 performs error correction and digital modulation. A DFT pre-coding section 102 performs pre-coding through DFT. A modulation section 103 modulates control data in the PUCCH. A spreading section 104 performs data spreading through codes specified by the specifications. A selection section 105 performs selection based on which one of the PUSCH and the PUCCH is transmitted. A resource map section 106 allocates data to be transmitted to a subcarriers to be transmitted. An OFDM signal generation section 107 generates an OFDM signal including a guard interval.

A transmit power control section D 108 performs transmit power control that is a key point of the present invention. A RF section 109 is constituted by to a subcarriers to be ranging from a D/A conversion (digital/analog conversion) section to an antenna. The RF section 109 includes a transmit power control section A, and transmit power control is performed by a control section 110 on the transmit power control section A and the transmit power control section D 108.

Here, for ease of description, it is assumed that, when the maximum number of RBs (hereinafter referred to as "RBm". RB stands for resource block, and is a unit in which a terminal accesses a base station) that can be used in a system is used and the gain of the transmit power control section A is maximized, the maximum transmit power required by the system is satisfied.

The control section 110 calculates R=RBm/RBs from the number of RBs used (hereinafter referred to as "RBs"), notification of which is to be received from the base station, and RBm. The transmit power control section D 108 performs transmit power control such that an output signal power is R times as large as a signal power that is input. As a result of this processing, a power input to the D/A conversion section becomes constant regardless of the number of RBs used, and it is possible to reduce the accuracy required for the D/A conversion section.

Next, a comparison is performed between a case where the transmit power control section D 108 is present and a case where the transmit power control section D 108 is not present, and a description will be given based on formula (5). However, for ease of description, a description will be given regardless of the maximum transmit power. That is, the focus is placed on only the right-hand formula of the function of min.

When the transmit power control section D 108 is not present, the transmit power control section A sets a gain based on the following formula.

[Formula 6]

$$P_{O\_PUSCH}(j) + \alpha(j) \cdot PL + \Delta_{TF}(i) + f(i) \qquad (7)$$

In contrast, when the transmit power control section D 108 is present, the transmit power control section A sets a gain based on the following formula.

[Formula 7]

$$P_{O\_PUSCH}(j) + \alpha(j) \cdot PL + \Delta_{TF}(i) + f(i) - 10 \log R \qquad (8)$$

That is, the control section 110 sets R used in the transmit power control section D 108 in accordance with RBm, and sets a gain in the transmit power control section A in accordance with formula (8). Furthermore, when the dynamic range of transmit power control required in the wireless system is set to be XdB (since the transmit power needs to be transmitted between a≤transmit power≤b, X=b−a), if the transmit power control section D is not present, a dynamic range of X+10 log (RBm/RBs) is required in the transmit power control section A. However, since the transmit power control section D 108 is present, it becomes possible to reduce the dynamic range of the transmit power control section A to X.

In the example having been shown here, since the transmit power control section D 108 is controlled in accordance with the number of RBs used, it is possible to perform control for making constant the power input to the D/A conversion section, but in contrast, control processing becomes complicated. In the following example, by discretely processing the number of RBs used, an example is shown in which the control is simplified. RBm is set to be 100 so that the above example is specifically described.

The following table shows a relationship between the number of RBs used and a gain R set by the transmit power control section D.

TABLE 1

| | Number of RBs | | | | | |
|---|---|---|---|---|---|---|
| | 1-4 | 5-8 | 9-16 | 17-32 | 33-64 | 65-100 |
| R | 32 | 16 | 8 | 4 | 2 | 1 |
| ≈10 log R | 15 | 12 | 9 | 6 | 3 | 0 |

As shown in the above table, the transmit power control section D 108 discretely sets R in the number of RBs used, and thus the processing becomes simplified. Specifically, since, in table 1, R is set by the power of 2, on the circuit, the transmit power control section can be configured by bit shift, and all values of 10 log R can be set by simple integers.

Needless to say, although, in the present embodiment, it is assumed that setting is made such that, when the maximum number of RBs that can be used in the system is used, and the gain of the transmit power control section A is maximized, the maximum transmit power required in the system is satisfied, this setting can be applied to a case where the minimum number of RBs is used as the reference or a case where an arbitrary number of RBs is set as the reference.

Furthermore, since the effect of the present invention lies in the fact that the accuracy required in the D/A conversion section can be reduced, and that the control gain range of the transmit power control section A of the RF section 109 can be designed such that the control gain range is not increased by variations in the number of RBs used, it is not required that the output of the transmit power control section D is exactly the same power.

Figure 4:
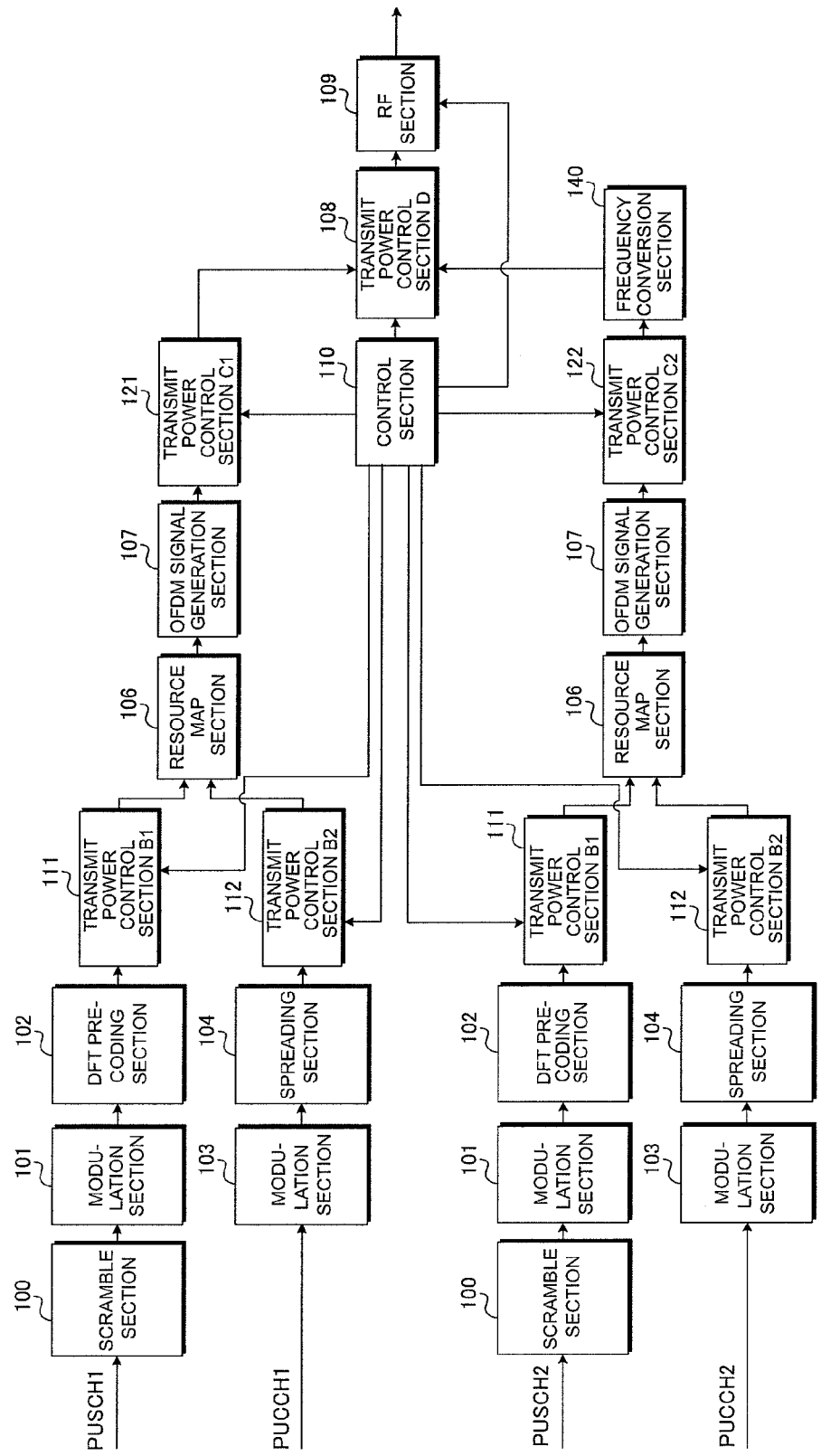
FIG. 4 A block diagram showing a schematic configuration of a transmission apparatus according to a third embodiment.

Consider, as an example, a system that performs carrier aggregation. The carrier aggregation (hereinafter referred to as "CA") is a method which is studied in a 4G system and in which the method specified in 3.9G is simultaneously used in a plurality of frequency bands. Although a transmission apparatus in the carrier aggregation is described in a third embodiment, a method of setting R with the number of frequency bands used in the carrier aggregation will be described here. This becomes the operation of the transmit power control section D 108 shown later in FIG. 4. Meanwhile, although FIG. 4 is described in the third embodiment, since the same number is given to blocks having the same function, the transmit power control section D 108 has the same function in the first and third embodiments.

TABLE 2

| Number of CC | 1 | 2 | 3 | 4 | 5 |
|---|---|---|---|---|---|
| R | 16 | 8 | 4 | 2 | 1 |
| ≈10 log R | 12 | 9 | 6 | 3 | 0 |

The above table shows a relationship between the number of frequency bands used in the CA of the transmit power control section D 108 and R. In this case, in the transmit power control section D 108, if the number of frequency bands used in the CA is great, the number of RBs used is determined to be great, and thus R is simply set. Even in this type of simple control, the effect of the invention, that is, the fact that accuracy required in the D/A conversion section can be reduced, and the fact that the control gain range of the transmit power control section A of the RF section 109 can be designed such that the control gain range is not increased by variations in the number of RBs used, is restrictively produced.

Although, in order to be able to describe the circuit configuration most simply, in the present embodiment, the transmit power control section D 108 is arranged behind the OFDM signal generation section 107, the position of the transmit power control section D 108 is not limited to such a position, and there is no problem as long as the transmit power control section D 108 is arranged between the resource map section and the RF section. Although, in the present embodiment, the PUSCH has been described in detail, it is possible to perform the same processing on the PUCCH. The control value is set at a different value depending on whether the PUSCH is transmitted or the PUCCH is transmitted.

As described above, in the present embodiment, it is possible to reduce the accuracy required in the D/A conversion section by controlling, depending on the number of RBs used (the frequency bandwidth used), power input in the D/A conversion section such that the power is constant, and to reduce the dynamic range of the transmit power control section A. From this viewpoint, the present invention is effective for a system having a wide range of the number of RBs used.

Second Embodiment

In addition to the first embodiment, in a second embodiment, a transmission apparatus that can transmit data in a different physical channel configuration used at each transmission opportunity (frame unit or packet unit) will be described. Although, in the first embodiment, the example has been described where different physical channels such as the PUSCH and the PUCCH are not simultaneously transmitted and the transmit power control section D 108 is controlled depending on the number of RBs of the PUSCH, in the present embodiment, transmit power control performed when the different physical channels such as the PUSCH and the PUCCH are simultaneously transmitted will be described.

Figure 2:
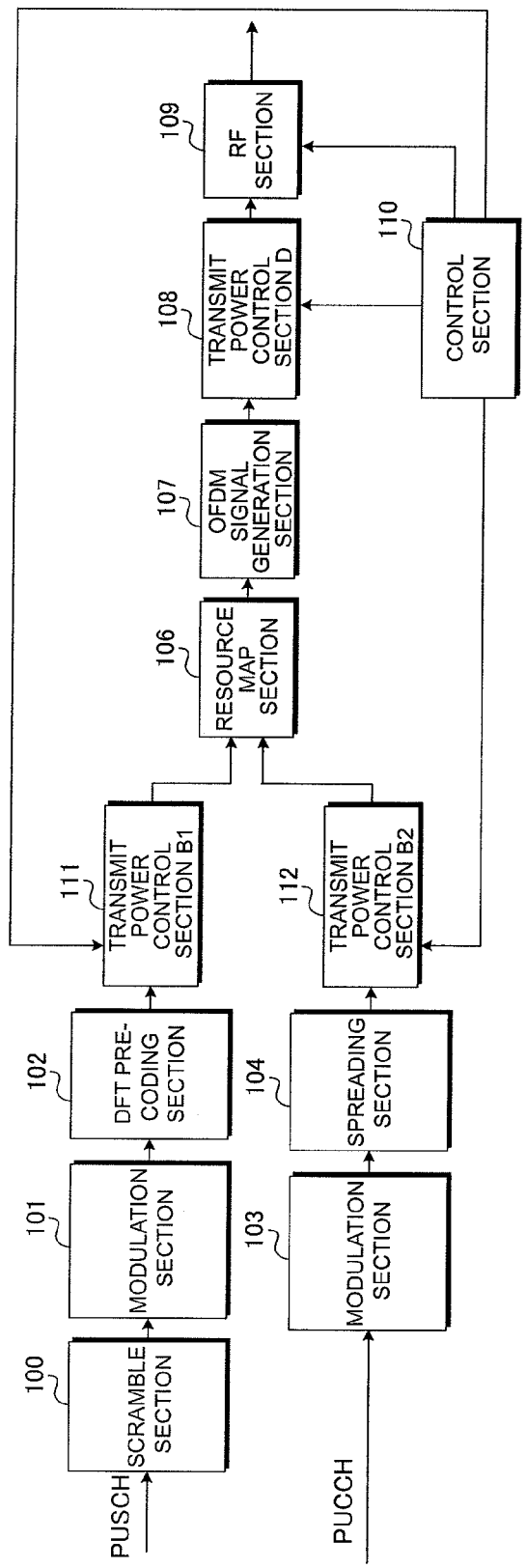
FIG. 2 A block diagram showing a schematic configuration of a transmission apparatus according to a second embodiment.

FIG. 2 is a block diagram showing a schematic configuration of a transmission apparatus according to the second embodiment. In FIG. 2, the blocks having the same functions as in FIG. 1 are identified with the same numbers, and thus their description will not be repeated. Therefore, FIG. 1 differs from FIG. 2 in a transmit power control section (B1) 111 and a transmit power control section (B2) 112. As in the first embodiment, based on formulas (5) and (6), a description will be given regardless of the maximum transmit power. That is, the focus is placed on only the right-hand formula of the function of min.

Figure 6:
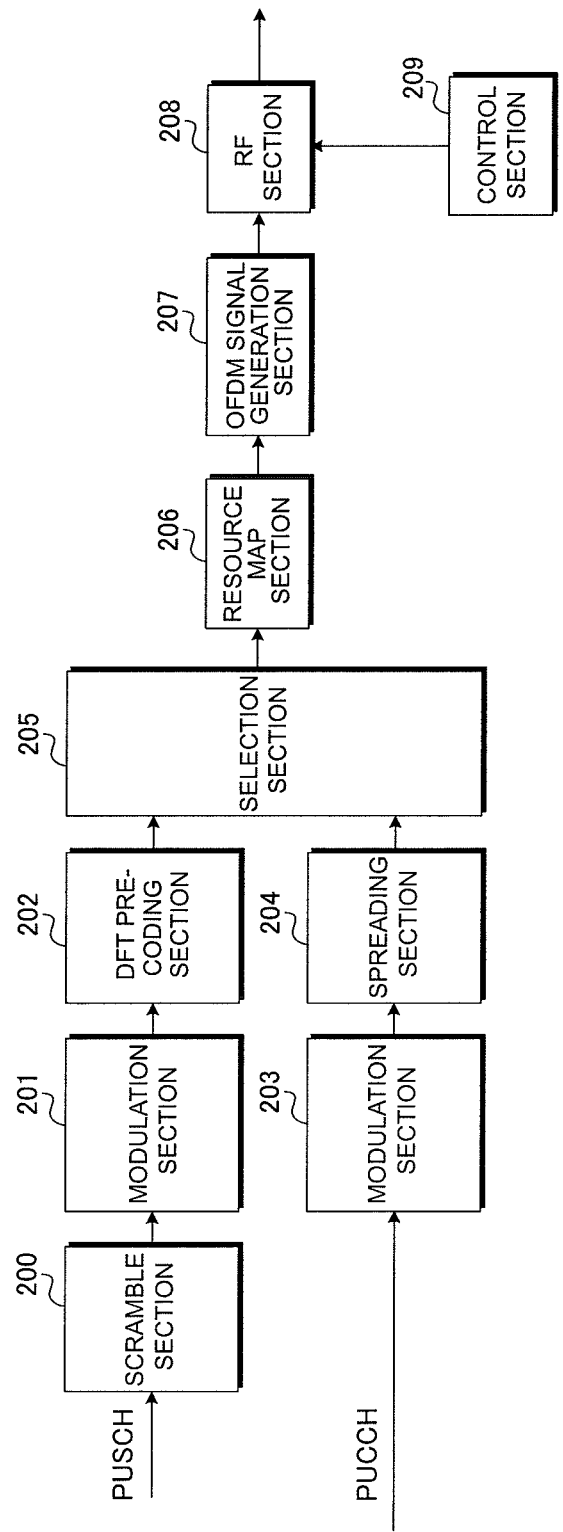
FIG. 6 A diagram showing the configuration of a transmission apparatus based on the specifications of 3.9G.

By comparison between formulas (5) and (6), it is known that items other than the item of PL are different from each other. Therefore, when the PUSCH and the PUCCH are simultaneously transmitted, it is impossible to perform control independently in the configuration shown in FIG. 1 or FIG. 6. In order to solve this problem, in the stage before the resource map section (more specifically, in the stage before the IFFT processing of the OFDM signal generation section), by using the block for performing the transmit power control, it is possible to simultaneously transmit data in different physical channels.

In the second embodiment, the transmit power control section (B1) 111 performs the transmit power control in accordance with values indicated by the following formula.

[Formula 8]

$$P_{O\_PUSCH}(j)+(\alpha(j)-1)\cdot PL+\Delta_{TF}(i)+f(i) \quad (9)$$

The transmit power control section B2 performs the transmit power control in accordance with values indicated by the following formula.

[Formula 9]

$$P_{O\_PUCCH}+h(n_{CQI},n_{HARQ})+\Delta_{F\_PUCCH}(F)+g(i) \quad (10)$$

Although the function of the transmit power control section D 108 is the same function described in the first embodiment, it is necessary to change the formula for determining R in consideration of the simultaneous transmission of the PUSCH and PUCCH. The ratio between gains set by the transmit power control section (B1) 111 and the transmit power control section (B2) 112 is set to be r (r=(the gain of the transmit power control section B2)/(the gain of the transmit power control section B1). When the number of RBs used in the PUCCH is set to be N (although, in formula (6), the number of RBs used in the PUCCH is set to be constant, but it is set to be N so as to be generalized), the number of RBs used in the PUSCH conversion is (RBs+rN). Thus, the transmit power control section D performs power control based on R=RBm/(RBs+rN). Naturally, a method of performing computation regardless of the PUCCH or a method of using a discrete value in place of the number of RBs described in the first embodiment can be used.

Furthermore, in the present embodiment, the transmit power control section A performs the transmit power control in accordance with the following formula.

[Formula 10]

$$PL-10\log R \quad (11)$$

As described above, the three transmit power control sections can perform the transmit power control indicated in formulas (5) and (6). Moreover, since processing for making the transmit power constant is performed before the RF section, it is possible to reduce performance required in the /D/A conversion section. In addition, in the present embodiment, variations in the gain of the transmit power control section A, which are considered to intrinsically have the widest dynamic range, are small as indicated in formula (11). A part of signals can be handled by the transmit power control section A. For example, when f(i) determined by control from the base station is handled by the transmit power control section A, this can be satisfactorily handled by changing formulas (9), (10) and (11) to formulas (12), (13) and (14).

[Formula 11]

$$P_{O\_PUSCH}(j)+(\alpha(j)-1)\cdot PL+\Delta_{TF}(i) \quad (12)$$

$$P_{O\_PUCCH}+h(n_{CQI},n_{HARQ})+\Delta_{F\_PUCCH}(F)+g(i)-f(i) \quad (13)$$

$$PL-10\log R+f(i) \quad (14)$$

What remains a concern in the configuration of the transmission apparatus described in the second embodiment is that the power greatly changes when being input into the OFDM signal generation section 107. This affects the resolution of the IFFT (inverse fast Fourier transform) circuit used in the generation of the OFDM signal. When the power of the input signal greatly changes, it is necessary to take a wide dynamic range of the signal that can be processed by the IFFT, and this results in an increase in the circuit size and furthermore in an increase in power consumption.

Figure 3:
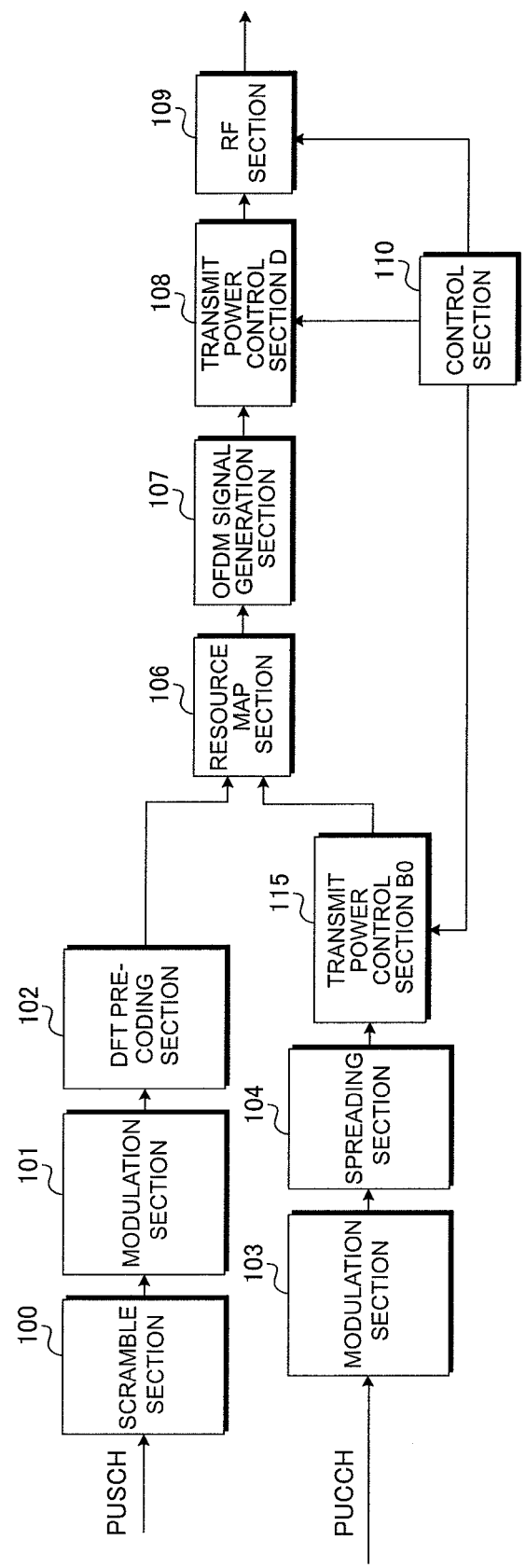
FIG. 3 A block diagram showing a schematic configuration of another transmission apparatus according to the second embodiment.

FIG. 3 is a block diagram showing a schematic configuration of another transmission apparatus in the second embodiment. FIG. 3 differs from FIG. 1 in a functional block indicated by a transmit power control section (B0) 115. When the PUSCH and the PUCCH are independently transmitted, the control section 110 performs the transmit power control indicated in the first embodiment. At that time, the gain of the transmit power control section (B0) 115 is set to be 1. In this case, the operation is performed on the assumption that the transmit power control section (B0) 115 is not present.

Then, when the transmission apparatus simultaneously transmits the PUSCH and the PUCCH, the gain of the transmit power control section (B0) 115 is set as β, and the same transmit power control as the PUSCH in the first embodiment is performed on the others. However, R may be recalculated on the assumption that R=RBm/(RBs+βN). This is based on the concept that, since the PUSCH and the PUCCH are transmitted from the same terminal, the necessary transmit power control is approximately the same and is dependent on only the difference of the accuracy required for the physical channel.

When this type of control is performed, the PUSCH is processed in the same manner as formula (5), and, with respect to the PUCCH, formula (6) is changed to the following formula.

[Formula 12]

$$P_{PUCCH}(i) = \min\{P_{CMAX}, P_{O\_PUSCH}(j) + \alpha(j) \cdot PL + \Delta_{TF}(i) + f(i) + \beta\} \quad (15)$$

In this case, β may be set at a fixed value including 0 or may be changed by being dependent on the details of the control data on the PUCCH. With this configuration, the accuracy required for the IFFT may be approximately the same as in the first embodiment, and it becomes possible to perform control in each physical channel. In addition, as in the first embodiment, a large part of transmit power control can be realized by the transmit power control section A.

However, it is necessary to change the formula for determining the transmit power depending on whether or not the PUSCH and the PUCCH are simultaneously transmitted. Although, in the present embodiment, the example has been described in which the transmit power control section is arranged behind the DFT pre-coding section 102 and the spreading section 104, the transmit power control section can be arranged in a place where different physical channels are independently controlled, such as, in the stage before the modulation sections 101 and 103.

Third Embodiment

In a third embodiment, in addition to the first and second embodiments, a transmission apparatus that can transmit data with a transmit power that is different for each component carrier constituting the carrier aggregation at each transmission opportunity (frame unit or packet unit) will be described. In the present embodiment, transmit power control on a system that performs the carrier aggregation (hereinafter referred to as "CA") will be described.

The CA is a method which is studied in a 4G system and in which the method specified in 3.9G is simultaneously used in a plurality of frequency bands. In the CA, there are two cases, that is, a case where frequency bands completely different from each other are used and a case where continuous frequency bands are used, but in the present embodiment, the focus is placed on the case where continuous frequency bands are used, and the RF section is assumed to be one configuration. Furthermore, although there is no limitation as to the number of frequency bands used in the CA, in the present embodiment, for ease of description, the number of frequency bands used in the CA is set to be 2. The frequency bands that constitute the CA are referred to as component carriers (CC).

FIG. 4 is a block diagram showing a schematic configuration of a transmission apparatus according to the third embodiment. In FIG. 2, the blocks having the same functions as in FIG. 2 are identified with the same numbers, and thus their description will be omitted. Therefore, FIG. 4 differs from FIG. 2 in a transmit power control section (C1) 121, a transmit power control section (C2) 122 and a frequency conversion section 140. Since it is necessary to change the frequency to realize the CA, in FIG. 4, the frequency conversion section 140 is provided. Moreover, although the transmit power control section D 108 has the same function, the calculation of R is based on the following formula.

[Formula 13]

$$R = \frac{(RBm1 + RBm2)}{(RBs1 + rN1 + RBs2 + rN2)} \quad (16)$$

In formula (16), 1 and 2 represent the numbers of the frequency bands that are subject to the CA, and, since the number of CCs is assumed to be 2, calculation is performed with only 1 and 2.

The following formula is a formula for determining the transmit power in the first and second embodiments.

[Formula 14]

$$P_{PUSCH}(i) = \min\{P_{CMAX}, 10 \log_{10}(M_{PUSCH}(i)) + P_{O\_PUSCH}(j) + \alpha(j) \cdot PL + \Delta_{TF}(i) + f(i)\} \quad (17)$$

The description has been given regardless of the left formula of min in formula (17). This is because, in order for the first and second embodiments to be described effectively, the left formula is unnecessary. In the present invention, a description will be given on the assumption that P is taken into consideration.

For example, when simultaneous transmission is performed on the PUSCH 1 and the PUSCH2, and a large number of RBs are used in the component carriers of the PUSCH 1 and the PUSCH2, a power necessary for transmission of the PUSCH 1 and a power necessary for transmission of the PUSCH 2 are added together, and consequently are assumed to exceed the $P_{CMAX}$. When the $P_{CMAX}$ is exceeded, in order to evenly reduce the power regardless of the carrier components, it is preferable to adjust the gain of the transmit power control section D 108 or the transmit power control section A. However, depending on the quality of service QoS of communication, interference from other cells, transmission capacity and the like, it may be necessary for the transmission apparatus to change the quality for each of the CCs. The transmit power control section (C1) 121 and the transmit power control section (C2) 122 are effective for such a system, and thus it is possible to control the transmit power for each of the CCs.

Figure 5:
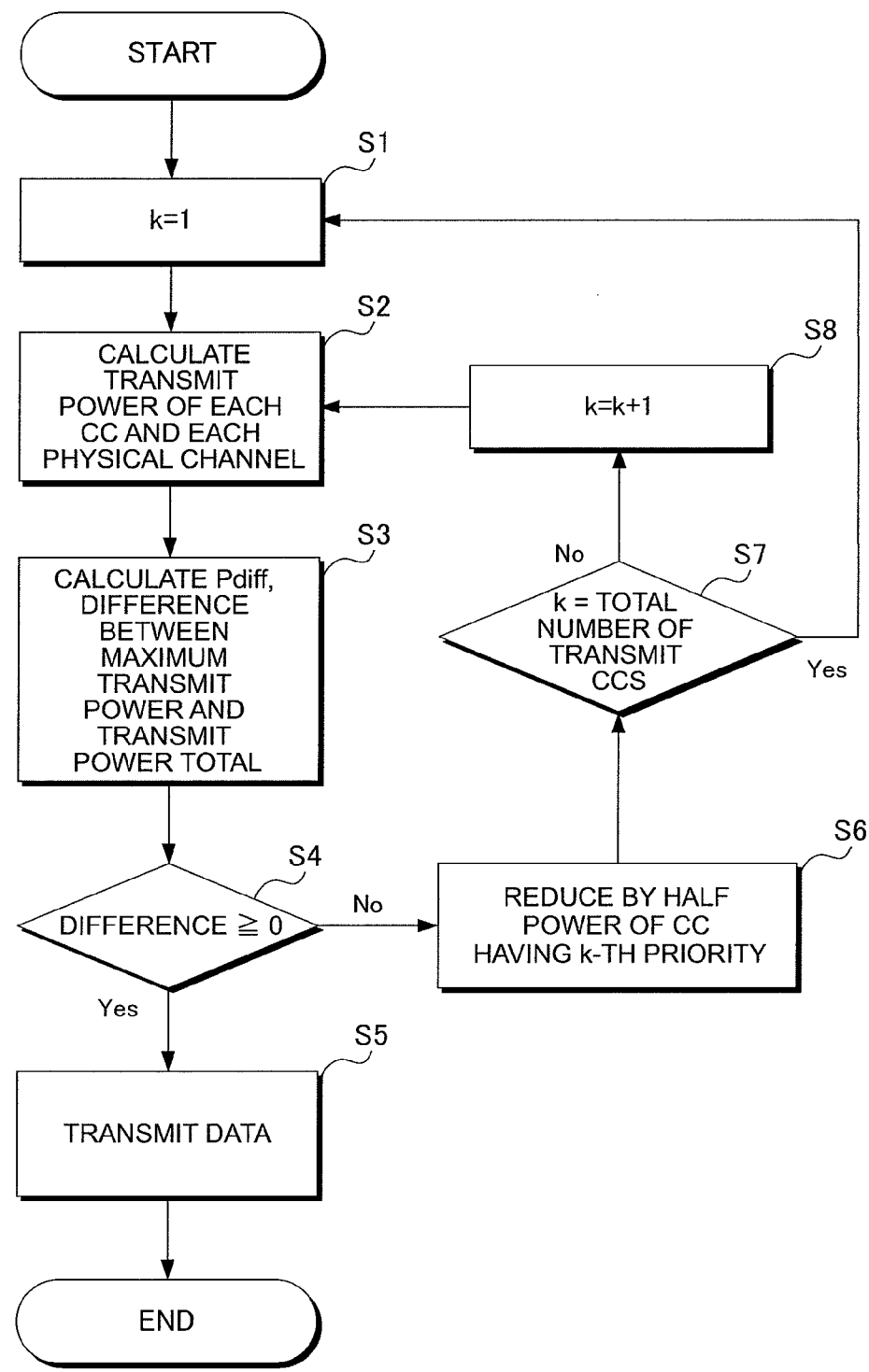
FIG. 5 A flowchart showing an operation of determining transmit power in the third embodiment.

FIG. 5 is a flowchart showing an operation of determining the transmit power in the third embodiment. However, priorities are set to be determined for the component carriers constituting the CA. In FIG. 5, a parameter on priority is first set (step S1). Then, the transmit power of each of the CCs and each of the physical channels is calculated (step S2). Then, Pdiff that is a difference between the maximum transmit power and the total transmit power is calculated (step S3). Next, whether or not the Pdiff is 0 or more is determined (step S4), and, if the Pdiff is 0 or more, data is transmitted (step S5) and the process is completed. In contrast, if, in step S4, the Pdiff is less than 0, the transmit power of a carrier component having the k-th priority is reduced by half (step S6). Then, whether or not k is equal to the total transmit number of CCs is determined (step S7), and, if k is not equal to the total transmit number of CCs, 1 is added to k (step S8), and steps from step S2 to step S4 are repeated. In contrast, if, in step S7, the number of CCs is equal to the total transmit number of CCs, the process is moved to step S1, and the same step is repeated.

As described above, by setting, in the transmit power control section (C1) 121, the control value set in step S6, it is possible to transmit power in each of the CCs and furthermore, prevent the total transmit power from exceeding the maximum transmit power. Meanwhile, although, in the flowchart shown in FIG. 5, in step S6, the example has been described in which the transmit power is reduced by half in order from the CC having the lowest priority, the operation of reducing the transmit power by half is an example, and it is needless to say that the transmit power can be reduced by ⅓, ¼ or the like. Furthermore, although the example has been described in which the transmit power is reduced sequentially, a method of reducing the transmit power from a specific CC can also be applied.

Although, in the above embodiments, basically, the description has been given based on the OFDM signal, the present invention is easily applied to other multicarrier signals.

100 Scramble section
101 and 103 Modulation section
102 DFT pre-coding section
104 Spreading section
105 Selection section
106 Resource map section
107 OFDM signal generation section
108 Transmit power control section D
109 RF section
110 Control section
111 Transmit power control section (B1)
112 Transmit power control section (B2)
115 Transmit power control section (B0)
121 Transmit power control section (C1)
122 Transmit power control section (C2)
140 Frequency conversion section

The invention claimed is:

1. A method of controlling a transmit power to transmit a plurality of physical channels using multi-carrier signals including a plurality of different subcarriers, said method comprising:
controlling a transmit power;
transmitting said plurality of physical channels; and
determining a transmit power of each physical channel with a plurality of control parameters for each transmission opportunity, wherein
said plurality of control parameters includes a control parameter specific for each physical channel,
at least one of said control parameters specific for said physical channels, before said plurality of physical channels is added, is used when a transmit power is controlled for said each physical channel,
after said plurality of physical channels is added, a transmit power for added data is controlled such that each physical channel has a desired transmit power, and
said plurality of physical channels is transmitted in which said transmit power is controlled to have said desired transmit power.

2. The method according to claim 1,
wherein at least one control parameter of said plurality of control parameters is used only for said plurality of added physical channels.

3. The method according to claim 1,
wherein said plurality of physical channels is added when an Orthogonal Frequency Division Multiplexing (OFDM) signal is generated.

4. The method according to claim 1, further comprising:
using a parameter on a transmission bandwidth of said control parameters to perform transmission power control on a signal before a digital-to-analog (D/A) conversion.

5. The method according to claim 1,
wherein at least one of said plurality of physical channels is a control channel.

6. The method according to claim 1,
wherein at least one of said plurality of physical channels is data pre-coded with a Discrete Fourier transform (DFT).

7. A transmission apparatus controlling a transmit power to transmit a plurality of physical channels using multi-carrier signals including a plurality of different subcarriers, said transmission apparatus comprising:
a control unit configured to control a transmit power; and
a transmission unit configured to transmit said plurality of physical channels,
wherein said control unit determines a transmit power of each physical channel with a plurality of control parameters for each transmission opportunity;
wherein said plurality of control parameters includes a control parameter specific for each physical channel;
wherein at least one of said control parameters specific for said physical channels, before said plurality of physical channels is added, is used when a transmit power is controlled for said each physical channel;
wherein, after said plurality of physical channels is added, a transmit power for added data is controlled such that each physical channel has a desired transmit power; and
wherein said plurality of physical channels is transmitted in which said transmit power is controlled to have said desired transmit power in said transmission unit.

8. The transmission apparatus according to claim 7, wherein at least one control parameter of said plurality of control parameters is used only for said plurality of added physical channels.

9. The transmission apparatus according to claim 7, wherein said plurality of physical channels is added when an Orthogonal Frequency Division Multiplexing (OFDM) signal is generated.

10. The transmission apparatus according to claim 7, further comprising a digital-to-analog (D/A) conversion unit, wherein said control unit uses a parameter on a transmission bandwidth of said control parameters to perform transmission power control on a signal before D/A conversion.

11. The transmission apparatus according to claim 7, wherein at least one of said plurality of physical channels is a control channel.

12. The transmission apparatus according to claim 7, wherein at least one of said plurality of physical channels is data pre-coded with a Discrete Fourier transform (DFT).

13. A transmission apparatus controlling a transmit power to transmit a plurality of physical channels using multi-carrier signals including a plurality of different subcarriers, said transmission apparatus comprising:
a control unit configured to control a transmit power; and
a transmission unit configured to transmit said plurality of physical channels,
wherein said control unit determines a transmit power of each physical channel with a plurality of control parameters for each transmission opportunity;

wherein, before said plurality of physical channels is added, with reference to at least one physical channel of said plurality of physical channels, a transmit power of other physical channels is controlled;

wherein, after said plurality of physical channels is added, a transmit power for added data is controlled such that each physical channel has a desired transmit power; and wherein said plurality of physical channels is transmitted in which a transmit power is controlled to have said desired transmit power in said transmission unit.

* * * * *